(12) United States Patent
Aoi et al.

(10) Patent No.: US 7,073,900 B2
(45) Date of Patent: *Jul. 11, 2006

(54) WATER BASE INK FOR INK-JET RECORDING

(75) Inventors: Noriatsu Aoi, Ichinomiya (JP); Akihiko Taniguchi, Aichi-ken (JP); Masaya Fujioka, Nagoya (JP); Shunichi Higashiyama, Yotsukaichi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 102 days.

This patent is subject to a terminal disclaimer.

(21) Appl. No.: 10/682,609

(22) Filed: Oct. 9, 2003

(65) Prior Publication Data
US 2004/0070655 A1   Apr. 15, 2004

(30) Foreign Application Priority Data
Oct. 9, 2002   (JP)   ............................ 2002-296397

(51) Int. Cl.
*B41J 2/01* (2006.01)
(52) U.S. Cl. .......................... 347/100; 347/95; 347/65; 106/31.13
(58) Field of Classification Search ............... 347/100, 347/95, 96, 101, 44, 65, 54; 106/31.13, 31.27, 106/31.6; 523/160
See application file for complete search history.

(56) References Cited

U.S. PATENT DOCUMENTS

| | | | | |
|---|---|---|---|---|
| 2,965,511 | A | * 12/1960 | Moser | .................. 106/413 |
| 5,281,262 | A | 1/1994 | Saito | |
| 5,854,307 | A | * 12/1998 | Kimura et al. | .............. 347/100 |
| 6,462,117 | B1 * | 10/2002 | Pourreau et al. | ............ 524/315 |
| 6,783,223 | B1 * | 8/2004 | Okada et al. | ................ 347/100 |
| 2002/0003560 | A1 | 1/2002 | Isono | |

FOREIGN PATENT DOCUMENTS

| | | |
|---|---|---|
| JP | 7-122044 | 12/1995 |
| JP | 10-278265 | 10/1998 |
| JP | 11-116865 | 4/1999 |
| JP | 2001-287455 | 10/2001 |
| JP | 2002-19102 | 1/2002 |

* cited by examiner

*Primary Examiner*—Manish S. Shah
(74) *Attorney, Agent, or Firm*—Reed Smith LLP

(57) ABSTRACT

A water base ink for ink-jet recording is provided, which makes it possible to perform the discharge operation stably and highly accurately for a long period of time without deteriorating a metal, for example, due to corrosion and/or dissolution even when the ink makes contact with the metal composed of nickel or an alloy containing nickel for a long period of time. The water base ink for ink-jet recording is usable for an ink-jet recording apparatus provided with an ink-jet head having a metal member which is composed of nickel or the alloy containing nickel and which is disposed at least in an ink supply passage for supplying the ink to a discharge section. The water base ink for ink-jet recording contains potassium p-tert-butylbenzoate, a coloring agent which is dispersible or soluble in water, water, and a water-soluble organic solvent.

8 Claims, 5 Drawing Sheets

WATER BASE INK FOR INK-JET RECORDING

BACKGROUND OF THE INVENTION

1. Field of the Invention

The present invention relates to a water base ink for ink-jet recording to be used for an ink-jet recording apparatus provided with an ink-jet head having a metal member which is composed of nickel or an alloy containing nickel and which is disposed at least in an ink supply passage for supplying the ink to a discharge section.

2. Description of the Related Art

The printer technique based on the ink-jet recording system is a printing technique based on, for example, the bubble system in which the ink is discharged from minute nozzles by using bubbles generated by the rapid heating, or the piezoelectric system in which the ink is discharged from minute nozzles by using a piezoelectric element that is deformable when a voltage is applied. In this technique, the inks for ink-jet recording of several colors, which serve as the basic colors, are converted into minute liquid droplets of several picoliters to several tens picoliters, and they are selectively landed on the paper surface to form an image thereby.

The ink-jet recording system is advantageous in that the high printing or typing quality and the high print or photographic quality are successfully obtained by controlling the discharge of the minute liquid droplets. Colors approximate to those obtained by the full color system can be reproduced and images without involving any granular texture can be formed by allowing the minute ink droplets of several picoliters to land highly accurately on the paper surface from the discharge nozzles having minute diameters. It is important not to cause any clog-up in order to stably discharge the minute ink droplets from the discharge nozzles having the minute diameters. It is necessary to use the ink for ink-jet recording from which any dust and impurities are removed from the ink by the precise filtration or microfiltration after the preparation.

However, when the water base ink for ink-jet recording is used for a long period of time in an ink-jet head having a metal member which is composed of nickel or an alloy containing nickel and which is disposed in the ink supply passage, then the metal member is corroded and/or the metal ion of nickel or the like is eluted from the metal member due to the long term contact with the water base ink for ink-jet recording. Therefore, any metal oxide is produced in some cases. In other cases, when the coloring agent is a dye, the metal ion and the dye form an insoluble inorganic salt to produce any deposit, or when the coloring agent is a water-insoluble pigment, the pigment particles are coagulated and/or deposited due to the metal ion even when the particle diameters of the pigment particles are controlled upon the preparation of the ink. As a result, the following problems have arisen. That is, any clog-up occurs at the filter and the nozzle, and it is impossible to perform the discharge operation stably and highly accurately for a long period of time.

In view of the above, Japanese Patent Application Laid-open No. 2001-287455 discloses a technique in which benzoic acid is added as a rustproofing or rust preventing agent to an ink for ink-jet recording, and Japanese Patent Publication No. 7-122044 discloses a technique in which sodium benzoate is added as an antiseptic/fungicidal agent to an ink for ink-jet recording. However, there is no disclosure about whether or not the inks for ink-jet recording described above are usable for the ink-jet head based on the use of nickel or the alloy containing nickel. On the other hand, Japanese Patent Application Laid-open No. 11-116865 discloses a technique in which an azine-based coloring agent and a phosphorus compound for preventing metal corrosion are contained in a hot melt type ink in order to avoid any corrosion at portions which make contact with the ink and which are based on the use of, for example, nickel or phosphorylation-treated nickel.

SUMMARY OF THE INVENTION

The present invention has been made in order to solve the problems as described above, an object of which is to provide a water base ink for ink-jet recording which does not deteriorate a metal, for example, due to any corrosion and/or dissolution even when the ink makes contact with the metal composed of nickel or an alloy containing nickel for a long period of time and which makes it possible to perform the discharge operation stably and highly accurately for a long period of time, and an ink-jet recording apparatus provided with the same.

According to a first aspect of the present invention, there is provided a water base ink for ink-jet recording usable for an ink-jet recording apparatus provided with an ink-jet head in which at least a part of an ink flow passage is formed of nickel or a nickel alloy; the water base ink for ink-jet recording comprising potassium p-tert-butylbenzoate; a coloring agent which is dispersible or soluble in water; water; and a water-soluble organic solvent. The potassium p-tert-butylbenzoate may be contained in an amount of 0.1 to 1.0% by weight in the ink. The ink cartridge which accommodates the ink of the invention is also provided. The ink cartridge may accommodate a plurality of color inks.

According to a second aspect of the present invention, there is provided an ink-jet recording apparatus comprising an ink which contains potassium p-tertbutyl-benzoate, a coloring agent which is dispersible or soluble in water, water, and a water-soluble organic solvent; an ink tank which accommodates the ink; and an ink-jet head which jets the ink supplied from the ink tank and which is provided with an ink flow passage, at least a part of the ink flow passage being formed of nickel or a nickel alloy. A nickel electrode may be disposed on an inner surface of the ink flow passage. The ink-jet head may be fabricated by stacking a plurality of nickel alloy plates and the ink flow passage may be formed in the stacked plates. The ink tank may be a replacable cartridge.

DESCRIPTION OF THE PREFERRED EMBODIMENTS

Figure 1:
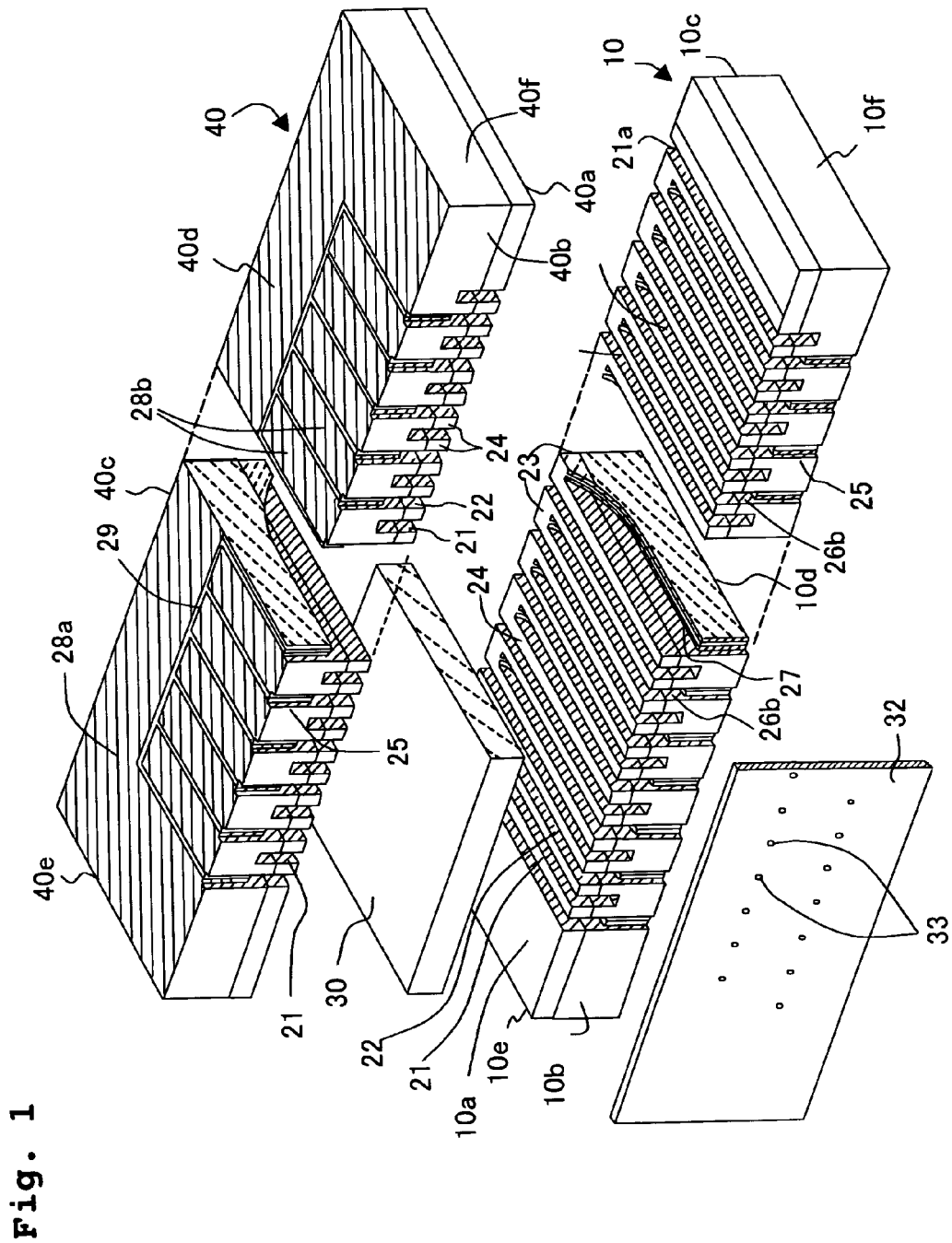
FIG. 1 shows an exploded perspective view illustrating an ink-jet head.

The water base ink for ink-jet recording of the present invention resides in the water base ink for ink-jet recording to be used for the ink-jet recording apparatus provided with the ink-jet head having the metal member which is composed of nickel or the alloy containing nickel and which is disposed at least in the ink supply passage for supplying the ink to the discharge section. The water base ink for ink-jet recording of the present invention contains potassium p-tert-butylbenzoate as a rustproofing or rust preventing agent. As a result of diligent investigations performed by the present inventors, it has been found out that when potassium p-tert-butylbenzoate is added to the water base ink for ink-jet recording, then potassium p-tert-butylbenzoate forms a dense synthetic coating on the surface of the metal composed of nickel or the alloy containing nickel, and the synthetic coating behaves as a protective film to suppress the corrosion and the dissolution. Thus, the present invention has been completed.

It is preferable that the potassium p-tertbutyl-benzoate is blended in an amount of 0.1 to 1.0% by weight with respect to the total amount of the water base ink for ink-jet recording of the present invention. If the blending amount is less than 0.1% by weight, the rustproofing effect is not obtained sufficiently in some cases. If the blending amount exceeds 1.0% by weight, then the storage stability of the water base ink for inkjet recording of the present invention is deteriorated in some cases, and the water base ink for ink-jet recording of the present invention tends to be solidified upon the evaporation of water in other cases.

The water base ink for ink-jet recording of the present invention contains the coloring agent which is dispersible or soluble in water. The coloring agent, which is dispersible or soluble in water, is not specifically limited. There are exemplified, for example, dyes and pigments. The coloring agent may be used singly. Alternatively, two or more of the coloring agents may be used in combination including, for example, combination of dyes, combination of pigments, and combination of one or more dyes and pigments.

The dye is not specifically limited, for which it is possible to preferably use, for example, cationic dyes and anionic dyes including, for example, basic dyes, acid dyes, direct dyes, and reactive dyes. Those commercially available may include, for example, Color Index Number (hereinafter referred to as "C. I." as well) Basic Red 1, 1:1, 2, 12, 13, 14, 18, 22, 27, 28, 29, 34, 38, 39, 46, 46:1, 67, 69, 70; C. I. Basic Violet 1, 2, 3, 4, 5, 7, 8, 10, 11, 11:1, 20, 33; C. I. Basic Blue 3, 6, 7, 9, 11, 12, 16, 17, 24, 26, 41, 47, 66; C. I. Basic Green 1, 4, 5; C. I. Basic Yellow 1, 11, 19, 21, 24, 25, 28, 29, 36, 45, 51, 67, 73; C. I. Basic Orange 14, 21, 22, 32; C. I. Basic Brown 1, 4; C. I. Direct Black 17, 19, 32, 51, 71, 108, 146, 154, 168; C. I. Direct Blue 6, 22, 25, 71, 86, 90, 106, 199; C. I. Direct Red 1, 4, 17, 28, 83, 227; C. I. Direct Yellow 12, 24, 26, 86, 98, 132, 142; C. I. Direct Orange 34, 39, 44, 46, 60; C. I. Direct Violet 47, 48; C. I. Direct Brown 109; C. I. Direct Green 59; C. I. Acid Black 2, 7, 24, 26, 31, 52, 63, 112, 118; C. I. Acid Blue 9, 22, 40, 59, 93, 102, 104, 113, 117, 120, 167, 229, 234; C. I. Acid Red 1, 6, 32, 37, 51, 52, 80, 85, 87, 92, 94, 115, 181, 256, 289, 315, 317; C. I. Acid Yellow 11, 17, 23, 25, 29, 42, 61, 71; C. I. Acid Orange 7, 19; C. I. Acid Violet 49; C. I. Food Black 1, 2; and C. I. Reactive Red 180.

The pigment is not specifically limited provided that the pigment is dispersible in the aqueous phase. The pigment may include, for example, carbon black, inorganic pigments, and organic pigments. The pigment as described above may be surface-treated, for example, with a surfactant and/or a high molecular weight dispersing agent.

The organic pigment is not specifically limited, which may include, for example, azo pigments such as azo lake pigment, insoluble azo pigment, condensed azo pigment, and chelate azo pigment; polycyclic pigments such as phthalocyanine pigment, perylene pigment, perynone pigment, anthraquinone pigment, quinacridone pigment, dioxazine pigment, thioindigo pigment, isoindolinone pigment, and quinophthalone pigment; dye lakes such as basic dye type lake and acidic dye type lake; nitro pigments; nitroso pigments; and aniline black daylight fluorescent pigments. The inorganic pigment is not specifically limited, which may include, for example, titanium oxide and iron oxide pigments, and carbon black pigments. The pigment, which is surface-treated with the surfactant and/or the high molecular weight dispersing agent, is not specifically limited, which may include, for example, graft carbon.

The coloring agent, which is dispersible or soluble in water, is preferably blended in an amount of 0.1 to 20% by weight, more preferably in an amount of 0.3 to 15% by weight, and much more preferably in an amount of 0.5 to 10% by weight with respect to the total amount of the ink for ink-jet recording of the present invention.

When the water base ink for ink-jet recording of the present invention contains the pigment as the coloring agent which is dispersible or soluble in water, it is preferable that an appropriate dispersing agent is added to perform a dispersing treatment in accordance with a known method. The dispersing agent is not specifically limited, which may include, for example, high molecular weight dispersing agents and surfactants. The high molecular weight dispersing agent is not specifically limited, which may include, for example, proteins such as gelatin and albumin; natural rubbers such as gum arabic and gum traganth; glucosides such as saponin; cellulose derivatives such as methyl cellulose, carboxy cellulose, and hydroxymethyl cellulose; natural high molecular weight compounds such as lignin sulfonic acid salt and shellac; anionic high molecular weight compounds such as polyacrylic acid salt, salt of styrene-acrylic acid copolymer, salt of vinylnaphthalene-acrylic acid copolymer, salt of styrene-maleic acid copolymer, salt of vinylnaphthalene-maleic acid copolymer, sodium salt of P-naphthalenesulfonic acid formalin condensate, and phosphoric acid salt; and nonionic high molecular weight compounds such as polyvinyl alcohol, polyvinyl pyrrolidone, and polyethylene glycol. The surfactant is not specifically limited, which may include, for example, anionic surfactants such as higher alcohol sulfate ester salt, liquid fatty oil sulfate ester salt, and alkylarylsulfonic acid salt; and nonionic surfactants such as polyoxyethylene alkyl ether, polyoxyethylene alkyl ester, sorbitan alkyl ester, and polyoxyethylene sorbitan alkyl ester. The dispersing agent as described above may be used singly. Alternatively, two or more of the dispersing agents as described above may be used in combination. The blending amount of the dispersing agent is preferably 0.01 to 20% by weight with respect to the total amount of the water base ink for ink-jet recording of the present invention.

The dispersing machine, which is used to perform the dispersing treatment for the pigment, is not specifically limited. There may be exemplified, for example, ball mill, roll mill, and sand mill. In particular, it is preferable to use a high speed type sand mill.

The water base ink for ink-jet recording of the present invention contains water. The water is preferably deionized water (pure water). The blending amount of the water is preferably not less than 40% by weight with respect to the total amount of the water base ink for inkjet recording of the present invention. If the blending amount is less than 40% by weight, it is sometimes impossible to maintain the viscosity of the ink in the normal state to be a low viscosity at which the jetting operation can be normally performed.

The water base ink for ink-jet recording of the present invention contains the water-soluble organic solvent. The water-soluble organic solvent is used principally in order to avoid any occurrence of deposition and drying-up from the water base ink for ink-jet recording of the present invention at the tip of the ink-jet head. The water-soluble organic solvent is not specifically limited. However, it is preferable to use those having low volatility and high dye-dissolving ability. There may be exemplified, for example, polyalkylene glycols such as polyethylene glycol; alkylene glycols such as ethylene glycol, propylene glycol, butylene glycol, diethylene glycol, dipropylene glycol, triethylene glycol, tripropylene glycol, 1,2,6-hexanetriol, thiodiglycol, 1,3-butanediol, 1,5-pentanediol, and hexylene glycol; glycerol; and pyrrolidones such as 2-pyrrolidone and N-methyl-2-pyrrolidone. The water-soluble organic solvent as described above may be used singly. Alternatively, two or more of the water-soluble organic solvents as described above may be used in combination.

The blending amount of the water-soluble organic solvent is preferably 5 to 40% by weight with respect to the total amount of the water base ink for ink-jet recording of the present invention. If the blending amount is less than 5% by weight, then the moistening function is insufficient, and problems concerning, for example, deposition and drying-up are caused in some cases. If the blending amount exceeds 40% by weight, the viscosity of the water base ink for ink-jet recording of the present invention is unnecessarily increased. As a result, problems are caused in some cases, for example, such that the jetting operation cannot be performed, and the ink is dried on the recording paper extremely slowly. The blending amount is more preferably 7 to 40% by weight and much more preferably 10 to 30% by weight.

If necessary, the water base ink for ink-jet recording of the present invention may further contain, for example, known permeating agents, resin binders, viscosity-adjusting agents, surface tension-adjusting agents, pH-adjusting agents, dye-dissolving agents, and antiseptic/fungicidal agents. The water base ink for ink-jet recording of the present invention may contain monovalent alcohol such as ethanol and isopropyl alcohol in order to control the drying performance and the permeating performance of the water base ink for ink-jet recording of the present invention into the recording paper.

The permeating agent effectively quickens the permeating velocity of the ink into the recording paper. Accordingly, the permeating agent improves the quick drying performance of the water base ink for ink-jet recording of the present invention on the paper surface to avoid any bleeding (blurring caused at the boundary between different colors) which would be otherwise caused by the slow drying property on the recording paper. The permeating agent is not specifically limited. However, it is preferable to use those which hardly cause the feathering (whisker-like blurring caused along the fiber of paper) which would be otherwise caused by the permeation. For example, polyvalent alcohol monoalkyl ether, which has low odor and low vapor pressure, is preferably used.

The polyvalent alcohol monoalkyl ether is not specifically limited, which may include, for example, diethylene glycol monomethyl ether, diethylene glycol monobutyl ether, diethylene glycol monoisobutyl ether, dipropylene glycol monomethyl ether, dipropylene glycol monopropyl ether, dipropylene glycol monoisopropyl ether, dipropylene glycol monobutyl ether, triethylene glycol monomethyl ether, triethylene glycol monobutyl ether, tripropylene glycol monomethyl ether, and tripropylene glycol monobutyl ether.

It is preferable that the permeating agent is blended in an amount of 3 to 15% by weight with respect to the total amount of the water base ink for ink-jet recording of the present invention. If the blending amount is less than 3% by weight, then the permeating velocity of the ink into the recording paper is slow, and problems concerning the drying time and the blurring arise in some cases. If the blending amount exceeds 15% by weight, the permeating velocity of the ink into the recording paper is too fast. As a result, the water base ink for ink-jet recording of the present invention arrives at the back of the recording paper in some cases, and any blurring is caused in other cases.

When the water base ink for ink-jet recording of the present invention is applied to the ink-jet system in which the ink is discharged in accordance with the action of thermal energy, thermal physical values including, for example, the specific heat, the coefficient of thermal expansion, and the coefficient of thermal conductivity may be adjusted.

The water base ink for ink-jet recording of the present invention is usable for the ink-jet recording apparatus provided with the ink-jet head having the metal member which is composed of nickel or the alloy containing nickel and which is disposed at least in the ink supply passage for supplying the ink to the discharge section. The ink-jet head as described above may include, for example, those having minute nozzles and ink supply passages for supplying the ink to the minute nozzles for forming an image on the surface of the recording medium by discharging the minute liquid droplets from the nozzles, for example, in which electrodes composed of nickel are arranged on inner surfaces of the ink supply passages as disclosed in Japanese Patent Application Laid-open No. 10-278265, or a plurality of plates, which are stacked so that the ink supply passages are provided therein, are composed of 42% nickel alloy steel as disclosed in Japanese Patent Application Laid-open No. 2002-19102. The water base ink for ink-jet recording of the present invention does not deteriorates the metal member even when the ink makes contact with the metal member composed of nickel or the alloy containing nickel for a long period of time. Therefore, the water base ink for ink-jet recording of the present invention is preferably usable for the ink-jet recording apparatus provided with the ink-jet head in which the metal member composed of nickel or the alloy containing nickel is used for the portion such as those disposed in the ink supply passage to make direct contact with the water base ink for ink-jet recording. An explanation will be made below with reference to the drawings about a preferred embodiment of the ink-jet head of the ink-jet recording apparatus as described above.

Figure 2:
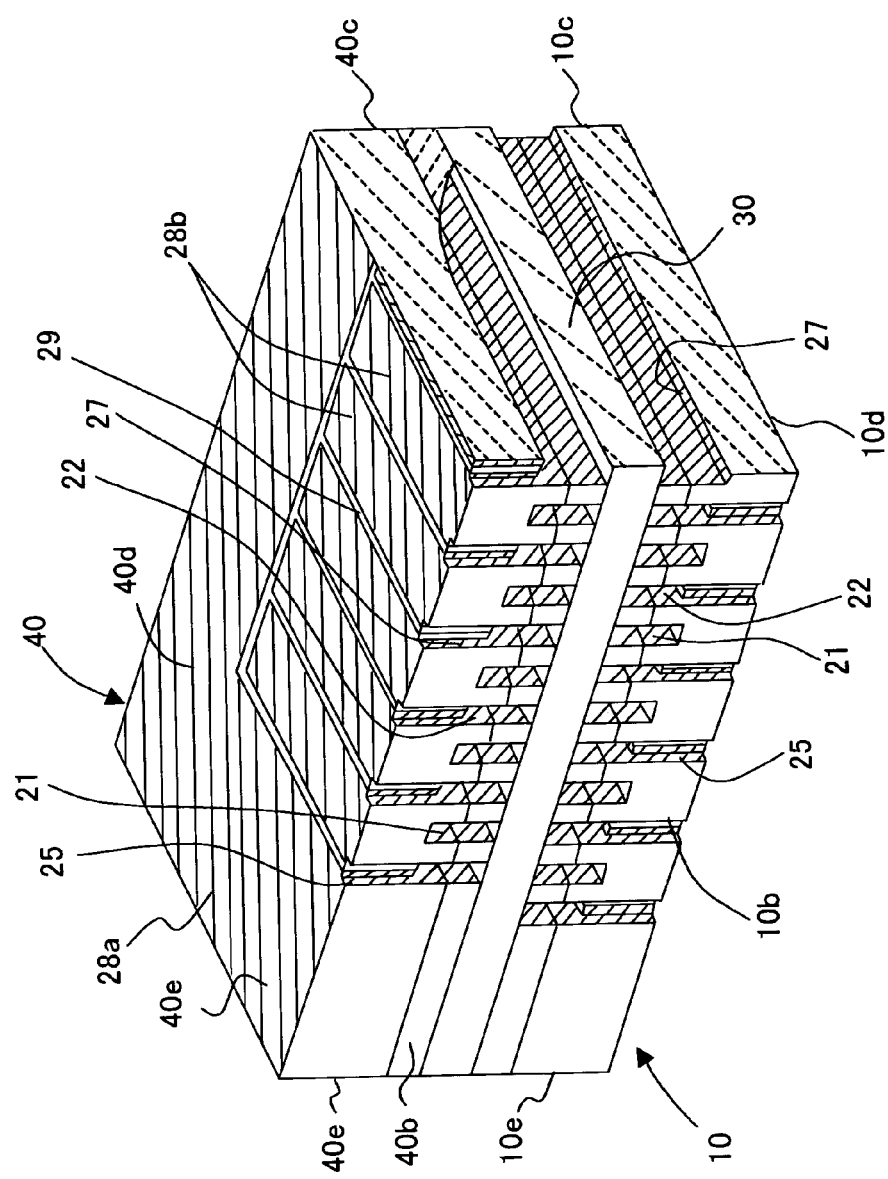
FIG. 2 shows a perspective view illustrating an assembled state of the ink-jet head.

FIG. 1 shows an exploded perspective view illustrating an ink-jet head, and FIG. 2 shows a perspective view illustrating an assembled state of the ink-jet head from which a nozzle plate is removed. The ink-jet head comprises two substrates 10, 40 each of which has ink grooves for constructing ink supply passages, a cover plate 30 which is interposed between the two substrates 10, 40, and the nozzle plate 32 which has nozzle holes 33 corresponding to the ink grooves. The two substrates 10, 40 are constructed substantially identically. Therefore, the substrate 10 disposed on one side is principally explained. As for the substrate 40, portions corresponding to respective portions 10a to 10f of the substrate 10 are designated as 40a to 40f in a substituted manner, any explanation of which will be omitted.

The plurality of ink grooves 21 for accommodating the ink and a plurality of dummy grooves 22 for forming the spaces are alternately formed in parallel to one another on the substrate 10. The both grooves are separated from each other by partition walls 24. Each of the partition walls 24 is constructed such that two piezoelectric materials, which are polarized mutually oppositely (arrows P shown in FIG. 4) in the height direction, are stacked in the height direction.

The ink groove 21 is formed such that the ink groove 21 is open on a first surface 10a of the substrate 10 in the longitudinal direction and the both ends of the ink groove 21 are open on both front and rear end surfaces 10b, 10c of the substrate 10. The dummy groove 22 is formed such that the dummy groove 22 is open on the first surface 10a of the substrate 10 in the longitudinal direction and one end of the dummy groove 22 is open on the front end surface 10b of the substrate 10 but the other end of the dummy groove 22 is closed by a wall 23 at the rear end surface 10c. The open surfaces of the both grooves 21, 22 in the longitudinal direction are covered with the cover plate 30 which is adhered to the surface 10a. Vertical grooves 25, which are continued to the dummy grooves 22, are formed on the front end surface 10b of the substrate 10. The vertical grooves 25 are connected to the first surface 10a of the substrate and the surface 10d disposed on the opposite side.

Figure 3:
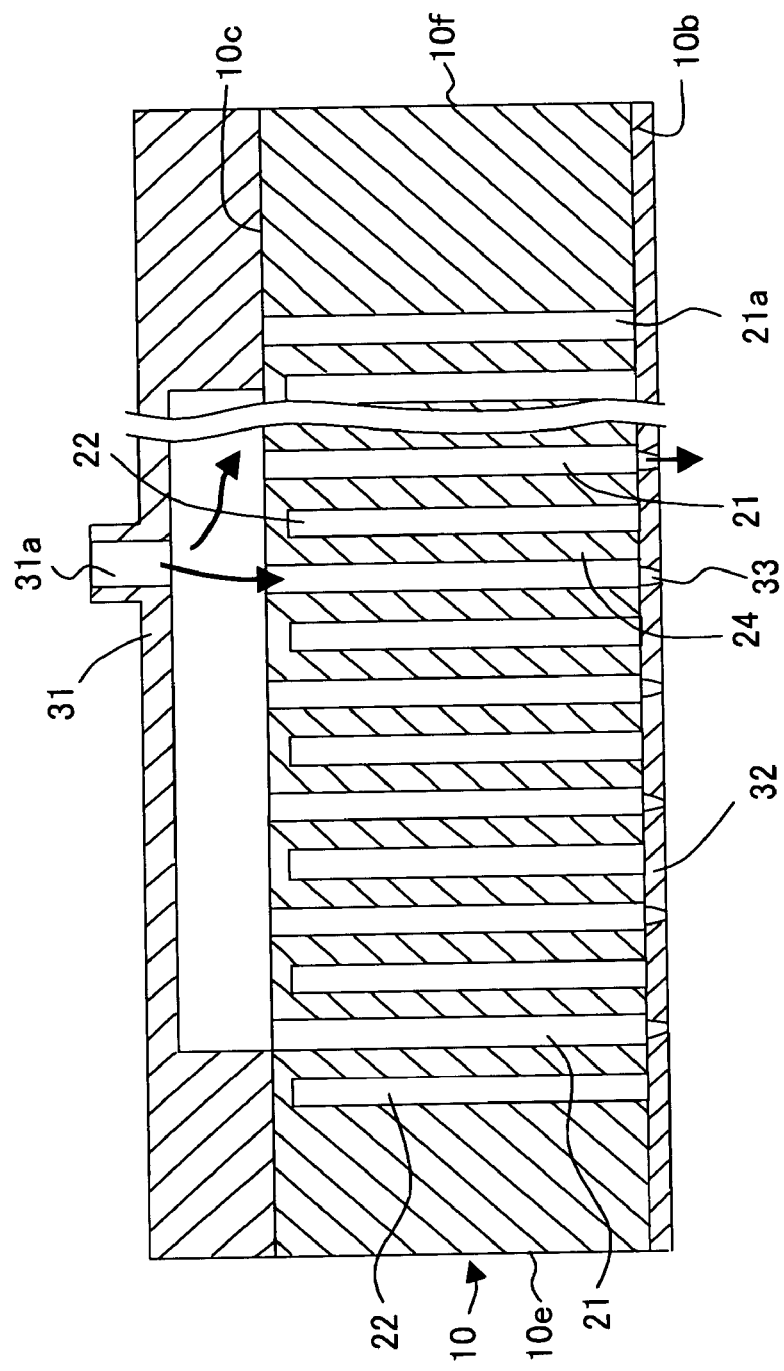
FIG. 3 shows a horizontal sectional view illustrating the ink-jet head.

A manifold 31 (FIG. 3) is connected to the rear end surface 10c of the substrate 10. The ink, which is supplied to a supply port 31a from an unillustrated ink supply source, is supplied to the plurality of ink grooves 21. The rear ends of the dummy grooves 22 are covered with the walls 23, and hence the ink is not supplied thereto. The nozzle plate 32, which has a plurality of nozzle holes 33 opposed to the front ends of the respective ink grooves 21, is joined to the front end surface 10b of the substrate 10.

Figure 4:
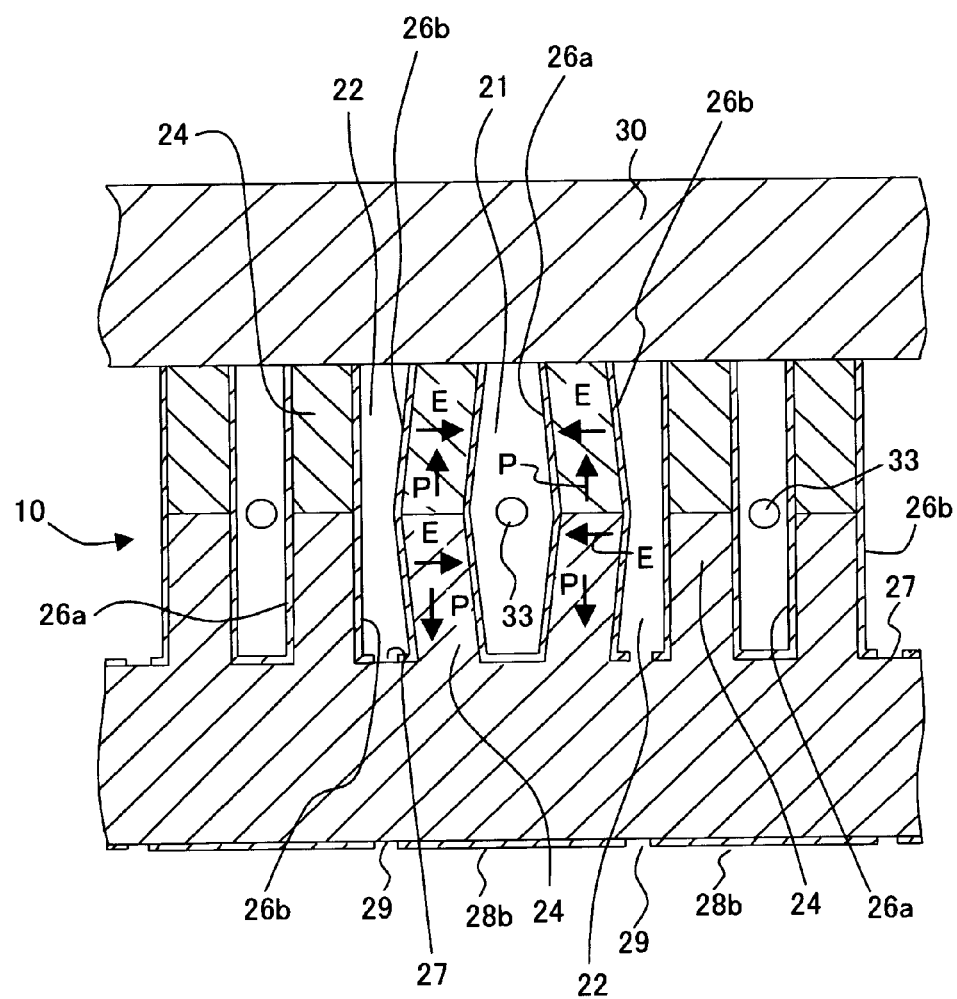
FIG. 4 shows a vertical sectional view illustrating the ink-jet head.

As shown in FIG. 4, nickel electrodes 26a, 26b are formed on inner side surfaces of the ink grooves 21 and the dummy grooves 22, i.e., on side surfaces of the partition walls 24 by the electroless plating method respectively. The electrodes 26b, 26b, which are opposed to one another in the dummy groove 22, are insulated from each other by a separation groove 27 formed along the groove bottom. Connecting terminals 28b are formed in an aligned manner on the second surface 10d disposed on the side opposite to the first surface 10a. The respective electrodes 26b, 26b, which are positioned on the both outer sides of one ink groove 21, are connected to one connecting terminal 28b via conductive layers formed on the side surfaces of the vertical grooves 25 formed continuously to the dummy grooves 22. The conductive layers, which are disposed on the side surfaces of the vertical grooves 25, are divided at the groove bottoms in the same manner as the respective electrodes 26b, 26b disposed in the dummy grooves 22. The electrodes 26b, 26b, which are opposed to one another in the dummy groove 22, are connected to the distinct connecting terminals 28b, 28b respectively.

A conductive layer, which is disposed on the second surface 10d and which is positioned outside the plurality of connecting terminals 28b, constitutes a connecting terminal 28a. The connecting terminal 28a is connected to the electrodes 26a disposed in all of the ink grooves 21 via a conductive layer disposed on the rear end surface 10c of the substrate 10. Insulation is effected by separation grooves 29 between the connecting terminal 28a and the connecting terminals 28b and between the connecting terminals 28b. Unillustrated flexible wiring members are joined by soldering to the connecting terminals 28a, 28b, which are connected to an external jetting pulse signal-generating source.

When the connecting terminal 28a, i.e., the electrodes 26a in all of the ink grooves 21 are grounded, and a pulse signal is applied to the electrodes 26b, 26b via the connecting terminal 28b corresponding to the ink groove 21 from which the ink is intended to be jetted, then the electric field E, which is perpendicular to the direction of polarization P, is generated in the partition walls 24, 24 disposed on the both sides of the ink groove 21 as shown in FIG. 4. As a result, upper and lower portions of the partition walls are subjected to the piezoelectric thickness sliding deformation in opposite directions respectively, and the volume of the ink groove 21 is expanded as a whole. Accordingly, the ink is sucked from the manifold 31 into the ink groove 21. When the application of the pulse signal is stopped thereafter, then the partition walls 24 are restored, and the pressure is applied to the ink contained in the ink groove. Thus, the ink is jetted as ink droplets through the nozzle hole 33.

The water base ink for ink-jet recording of the present invention contains potassium p-tert-butylbenzoate. Accordingly, even when the water base ink for ink-jet recording of the present invention makes contact with the metal composed of nickel or the alloy containing nickel for a long period of time, then the dense synthetic coating is formed on the metal surface, and the synthetic coating serves as the protective film to suppress the corrosion and the dissolution. Therefore, the metal is not deteriorated. When the water base ink for ink-jet recording of the present invention is used for the ink-jet recording apparatus provided with the ink-jet head having the metal member which is composed of nickel or the alloy containing nickel and which is disposed at least in the ink supply passage for supplying the ink to the discharge section, then the clog-up of the filter and the nozzle is not caused, which would be otherwise caused by the corrosion of the metal member in the ink supply passage and the dissolution of the ion of metal such as nickel from the metal member. Thus, it is possible to perform the stable discharge operation highly accurately for a long period of time.

EXAMPLES

The present invention will be explained in further detail below as exemplified by Examples. However, the present invention is not limited to only Examples.

In Examples 1 to 3, the following materials were sufficiently mixed and agitated to prepare water base inks for ink-jet recording having the following compositions respectively.

Example 1

C. I. Acid Red 52: 2% by weight;
Polyethylene glycol #200: 19% by weight;
Diethylene glycol: 9% by weight;
Triethylene glycol monobutyl ether: 6% by weight;
Polyvinyl pyrrolidone (weight average molecular weight: 1200 to 1500): 1% by weight;
Thiazole compound (fungicidal agent produced by Avecia, Proxel XL-2): 0.2% by weight;

Potassium p-tert-butylbenzoate (LAMIPROOF A-1 produced by DAI-ICHI KOGYO SEIYAKU CO., LTD., active ingredient: 40% by weight): 0.5% by weight;

Ion exchange water: balance.

Example 2

Carbon black (CAB-O-JET 300 produced by Cabot Specialty Chemicals Inc., converted by calculation into carbon amount): 5% by weight;
Glycerol: 21% by weight;
Triethylene glycol monobutyl ether: 6% by weight;
Potassium p-tert-butylbenzoate (LAMIPROOF A-1 produced by DAI-ICHI KOGYO SEIYAKU CO., LTD., active ingredient: 40% by weight): 0.75% by weight;
Ion exchange water: balance.

Example 3

C. I. Acid Blue 9: 3% by weight;
C. I. Acid Red 52: 2% by weight;
Polyethylene glycol #200: 19% by weight;
Diethylene glycol: 9% by weight;
Triethylene glycol monobutyl ether: 6% by weight;
Polyvinyl pyrrolidone (weight average molecular weight: 1200 to 1500): 1% by weight;
Thiazole compound (fungicidal agent produced by Avecia, Proxel XL-2): 0.2% by weight;
Potassium p-tert-butylbenzoate (LAMIPROOF A-1 produced by DAI-ICHI KOGYO SEIYAKU CO., LTD., active ingredient: 40% by weight): 2% by weight;
Ion exchange water: balance.

Comparative Example 1

A water base ink for ink-jet recording was prepared in the same manner as in Example 1 except that the blending amount of ion exchange water was increased in place of the blending of potassium p-tert-butylbenzoate (LAMIPROOF A-1 produced by DAI-ICHI KOGYO SEIYAKU CO., LTD., active ingredient: 40% by weight).

Comparative Example 2

A water base ink for ink-jet recording was prepared in the same manner as in Example 2 except that the blending amount of ion exchange water was increased in place of the blending of potassium p-tert-butylbenzoate (LAMIPROOF A-1 produced by DAI-ICHI KOGYO SEIYAKU CO., LTD., active ingredient: 40% by weight).

Comparative Example 3

A water base ink for ink-jet recording was prepared in the same manner as in Example 3 except that the blending amount of ion exchange water was increased in place of the blending of potassium p-tert-butylbenzoate (LAMIPROOF A-1 produced by DAI-ICHI KOGYO SEIYAKU CO., LTD., active ingredient: 40% by weight).

Evaluation

Evaluation of Discharge Performance

The water base inks for ink-jet recording prepared in Examples 1 to 3 and Comparative Examples 1 to 3 were used to evaluate the discharge performance from the nozzles of the ink-jet recording apparatus provided with the ink-jet head as shown in FIGS. 1 to 4 in which the nickel electrodes were exposed to the interior of the ink grooves. The initial confirmation was made as follows. That is, it was confirmed that the water base inks for ink-jet recording were normally discharged from all of the nozzles. Subsequently, the printing was performed after being left to stand for 1 week at room temperature. The operation, in which the inks were left to stand for 1 week at room temperature and the printing was performed, was repeatedly performed for 12 weeks. Judging from the discharge state after 12 weeks, the discharge performance was evaluated on the basis of the following criteria. Obtained results of the evaluation are shown in Table 1.

A: After 12 weeks, neither discharge failure nor bending was observed at all.

B: After 12 weeks, no discharge failure was observed. The bending was observed to a slight extent, but the bending was restored in a short period of time.

C: After 12 weeks, the discharge failure and the bending were observed to slight extents, and they were not restored in a short period of time.

D: After 12 weeks, the discharge failure and the bending were observed to great extents, and they were not restored in a short period of time.

Evaluation of Metal Corrosion

Nickel pieces were immersed in the water base inks for ink-jet recording prepared in Example 1 to 3 and Comparative Examples 1 to 3 to perform a test of being left to stand at 60° C. for 2 weeks. After the test of being left to stand, the surfaces of the metal pieces were observed to evaluate the degree of corrosion on the basis of the following criteria. Obtained results of the evaluation are shown in Table 1.

A: No evidence of corrosion was found on the surface of the metal piece.

B: Any evidence of corrosion was found to some extent on the surface of the metal piece.

C: The evidence of intense corrosion was found on the surface of the metal piece.

D: The surface of the metal piece was intensely corroded, and a large amount of deposit was found.

Confirmation of Impurity Production

The water base inks for ink-jet recording, which remained after being used for the test of being left to stand at 60° C. for 2 weeks in the evaluation of metal corrosion, were confirmed for the presence or absence of any impurity production by means of the microscopic observation. The evaluation was made in accordance with the following criteria. Obtained results of the evaluation are shown in Table 1.

A: Neither deposition nor aggregation was observed in the water base ink for ink-jet recording.

B: The deposition and the aggregation were slightly observed in the water base ink for ink-jet recording. The ratio of matters of deposition and aggregation, by which the microscopic observation field was occupied, was less than 5%.

C: The deposition and the aggregation were observed in the water base ink for ink-jet recording. The ratio of matters of deposition and aggregation, by which the microscopic observation field was occupied, was 5 to 15%.

D: The deposition and the aggregation were observed in large amounts in the water base ink for ink-jet recording. The ratio of matters of deposition and aggregation, by which the microscopic observation field was occupied, was above 15%.

TABLE 1

| Water base ink for ink-jet recording | Evaluation of discharge performance | Evaluation of metal corrosion | Confirmation of impurity production |
|---|---|---|---|
| Example 1 | A | A | A |
| Example 2 | A | A | A |
| Example 3 | A | A | A |
| Comp. Ex. 1 | B | C | B |
| Comp. Ex. 2 | D | D | D |
| Comp. Ex. 3 | C | C | C |

As shown in Table 1, the inks for ink-jet recording prepared in Examples 1 to 3 did not corrode the metal member, and they did not cause the aggregation and the deposition which would otherwise cause the clog-up of the filter and the nozzle as well, wherein the stable jetting operation was successfully performed for a long period of time. On the other hand, any one of the inks for ink-jet recording prepared in Comparative Examples 1 to 3 involved the following problems. That is, the metal member was corroded, the deposition and the aggregation were caused, and it was unsuccessful to perform the stable jetting operation for a long period of time.

An embodiment of an ink jet printer as an ink-jet recording apparatus in accordance with the invention will be described as below with reference to the accompanying drawings.

Figure 5:
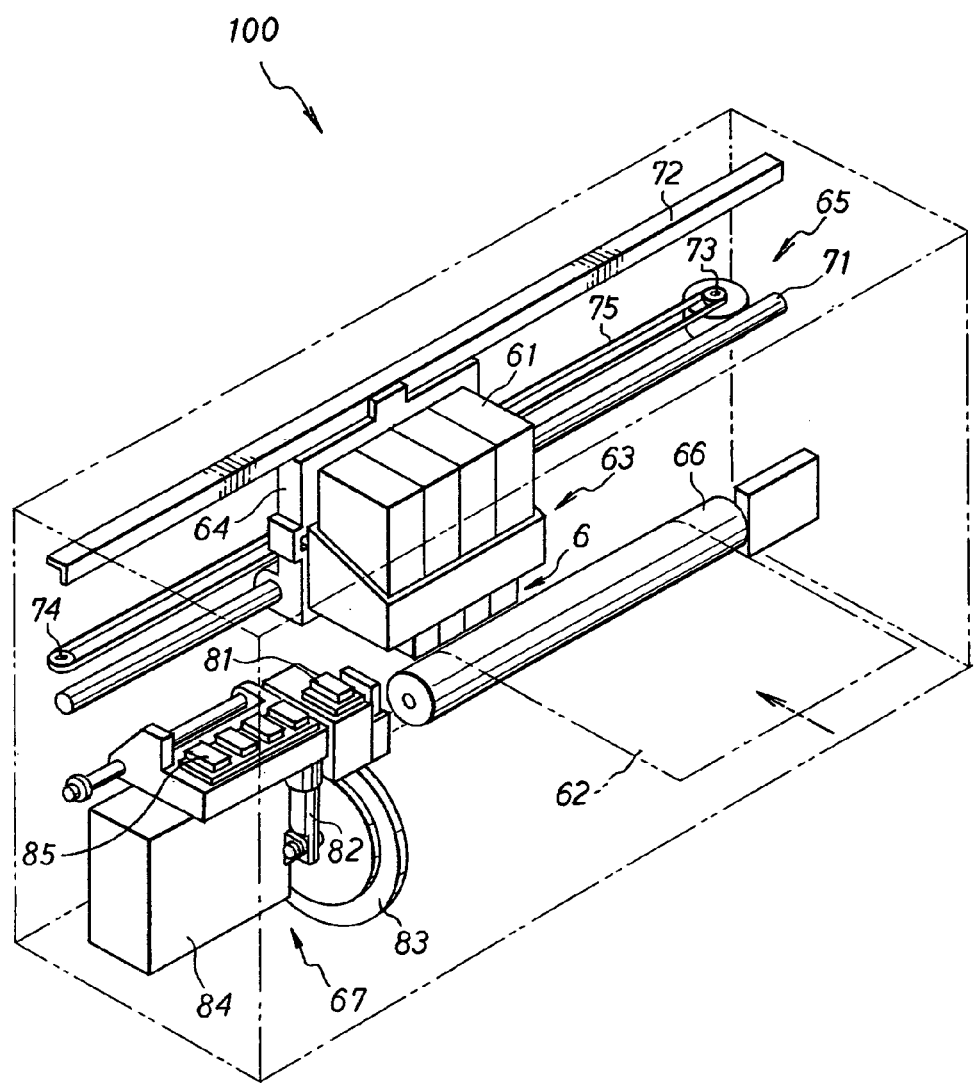
FIG. 5 shows a perspective view illustrating an embodiment of a color ink-jet printer as an ink-jet recording apparatus of the present invention.

As shown in FIG. 5, a color ink jet printer 100 includes four ink cartridges (ink set) 61, each of which contains a respective color of ink, such as cyan, magenta, yellow and black ink, a head unit 63 having an ink jet printer head 6 which has a structure as shown in FIGS. 1–4 for ejecting ink onto a sheet 62, a carriage 64 on which the ink cartridges 61 and the head unit 63 are mounted, a drive unit 65 that reciprocates the carriage 64 in a straight line, a platen roller 66 that extends in a reciprocating direction of the carriage 64 and is disposed opposite to the head 6, and a purge unit 67. As the black, cyan, magenta and yellow ink, the ink prepared in the above examples can be used.

The drive unit 65 includes a carriage shaft 71, a guide plate 72, two pulleys 73 and 74, and an endless belt 75. The carriage shaft 71 is disposed at a lower end portion of the carriage 64 and extends in parallel with the platen roller 66. The guide plate 72 is disposed at an upper end portion of the carriage 64 and extends in parallel with the carriage shaft 71. The pulleys 73 and 74 are disposed at both end portions of the carriage shaft 71 and between the carriage shaft 71 and the guide plate 72. The endless belt 75 is stretched between the pulleys 73 and 74.

As the pulley 73 is rotated in normal and reverse directions by a motor, the carriage 64, connected to the endless belt 75, is reciprocated in the straight direction, along the carriage shaft 71 and the guide plate 72, in accordance with the normal and reverse rotation of the pulley 73.

The sheet 62 is supplied from a sheet cassette (not shown) provided in the ink jet printer 100 and fed between the head 6 and the platen roller 66 to perform predetermined printing by ink droplets ejected from the head 6. Then, the sheet 62 is discharged to the outside. A sheet feeding mechanism and a sheet discharging mechanism are omitted from FIG. 5.

The purge unit 67 is provided on a side of the platen roller 66. The purge unit 67 is disposed to be opposed to the head 6 when the head unit 63 is located in a reset position. The purge unit 67 includes a purge cap 81, a pump 82, a cam 83, and a waste ink reservoir 84. The purge cap 81 contacts a nozzle surface to cover a plurality of nozzles formed in the head 6. When the head unit 63 is placed in the reset position, the nozzles in the head 6 are covered with the purge cap 81 to inhale ink including air bubbles trapped in the head 6 by the pump 82 and by the cam 83, thereby purging the head 6. The inhaled ink is stored in the waste ink reservoir 84.

According to the present invention, it is possible to provide the water base ink for ink-jet recording which does not deteriorate the metal, for example, due to the corrosion and the dissolution even when the ink makes contact with the metal composed of nickel or the alloy containing nickel for a long period of time, wherein the discharge operation can be performed stably and highly accurately for a long period of time even when the ink is used for the ink-jet recording apparatus provided with the ink-jet head having the metal member which is composed of nickel or the alloy containing nickel and which is disposed at least in the ink supply passage for supplying the ink to the discharge section. The invention can also provide the ink-jet recording apparatus which can stably and accurately discharge the ink for a long period of time.

What is claimed is:

1. A water base ink for ink-jet recording usable for an ink-jet recording apparatus provided with an ink-jet head in which at least a part of an ink flow passage is formed of nickel or a nickel alloy, the water base ink for ink-jet recording comprising:
   potassium p-tert-butylbenzoate;
   a coloring agent which is dispersible or soluble in water;
   water; and
   a water-soluble organic solvent.

2. The water base ink for ink-jet recording according to claim 1, wherein the potassium p-tert-butylbenzoate is contained in an amount of 0.1 to 1.0% by weight in the ink.

3. An ink cartridge which accommodates the water base ink defined in claim 1.

4. An ink-jet recording apparatus comprising:
   an ink which contains potassium p-tert-butylbenzoate, a coloring agent which is dispersible or soluble in water, water, and a water-soluble organic solvent;
   an ink tank which accommodates the ink; and
   an ink-jet head which jets the ink supplied from the ink tank and which is provided with an ink flow passage, at least a part of the ink flow passage being formed of nickel or a nickel alloy.

5. The ink-jet recording apparatus according to claim 4, wherein a nickel electrode is disposed on an inner surface of the ink flow passage.

6. The ink-jet recording apparatus according to claim 4, wherein the ink-jet head is fabricated by stacking a plurality of nickel alloy plates and the ink flow passage is formed in the stacked plates.

7. The ink-jet recording apparatus according to claim 4, wherein the ink tank is a replaceable cartridge.

8. The ink-jet recording apparatus according to claim 4, wherein the potassium p-tert-butylbenzoate is contained in an amount of 0.1 to 1.0% by weight in the ink.

* * * * *